US011032199B2

(12) United States Patent
Uberoy (10) Patent No.: US 11,032,199 B2
(45) Date of Patent: *Jun. 8, 2021

(54) METHODS AND APPARATUS FOR PROVIDING TRAFFIC FORWARDER VIA DYNAMIC OVERLAY NETWORK

(71) Applicant: ViaSat, Inc., Carlsbad, CA (US)

(72) Inventor: Pawan Uberoy, San Jose, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,854

(22) Filed: Apr. 8, 2020

(65) Prior Publication Data

US 2020/0236050 A1 Jul. 23, 2020

Related U.S. Application Data

(63) Continuation of application No. 16/107,944, filed on Aug. 21, 2018, now Pat. No. 10,630,586, which is a
(Continued)

(51) Int. Cl.
*H04L 12/741* (2013.01)
*H04L 12/721* (2013.01)
(Continued)

(52) U.S. Cl.
CPC .......... *H04L 45/745* (2013.01); *H04L 45/38* (2013.01); *H04L 45/64* (2013.01); *H04L 47/125* (2013.01);
(Continued)

(58) Field of Classification Search
None
See application file for complete search history.

(56) References Cited

U.S. PATENT DOCUMENTS 7,536,290 B1 5/2009 Browning et al.
8,547,872 B2 10/2013 Raleigh
(Continued)

OTHER PUBLICATIONS

Kishore Inampudi, Dynamic Service Chaining for NFV/SDN, Presentation, 22 pages.
(Continued)

*Primary Examiner* — Diane L Lo
(74) *Attorney, Agent, or Firm* — James M. Wu; JW Law Group (57) ABSTRACT

A process capable of facilitating network communication using forwarders or vforwarders interconnected via an overlay network is disclosed. The process, in one aspect, is able to receive a packet stream or network traffic from a customer premise equipment ("CPE") using a point-to-point ("PTP") connection via the overlay network. After identifying a service component able to provide a network function ("NF") in accordance with the packet stream, at least a portion of the packet stream is forwarded to the service component via a second PTP connection through the overlay network according to a set of predefined requirements. Upon receipt of a processed packet stream in response to the packet stream from the service component, the processed packet stream is forwarded to another forwarder via a hop-to-hop ("HTH") link through the overlay network in accordance with the processed packet stream.

28 Claims, 10 Drawing Sheets

Related U.S. Application Data continuation of application No. 15/249,127, filed on Aug. 26, 2016, now Pat. No. 10,075,373.

(51) Int. Cl.

| | | |
|---|---|---|
| *H04L 12/715* | (2013.01) | |
| *H04L 29/08* | (2006.01) | |
| *H04L 12/803* | (2013.01) | |
| *H04L 29/06* | (2006.01) | |
| *H04L 12/851* | (2013.01) | |

(52) U.S. Cl.
CPC .......... *H04L 65/1069* (2013.01); *H04L 67/10* (2013.01); *H04L 67/104* (2013.01); *H04L 67/327* (2013.01); *H04L 47/2483* (2013.01)

(56) References Cited

U.S. PATENT DOCUMENTS

| | | | |
|---|---|---|---|
| 8,599,697 B2 | 12/2013 | Ricciulli | |
| 8,665,876 B2 | 3/2014 | Cardona et al. | |
| 8,717,895 B2 | 5/2014 | Koponen et al. | |
| 8,839,387 B2 | 9/2014 | Raleigh | |
| 9,088,475 B2 | 7/2015 | Patel et al. | |
| 9,143,582 B2 | 9/2015 | Banavalikar et al. | |
| 10,630,586 B2 * | 4/2020 | Uberoy | H04L 67/327 |
| 2007/0078969 A1 | 4/2007 | Ngo et al. | |
| 2013/0034094 A1 | 2/2013 | Cardona et al. | |
| 2014/0136671 A1 | 5/2014 | Drake et al. | |
| 2014/0334295 A1 | 11/2014 | Guichard et al. | |
| 2015/0195197 A1 | 7/2015 | Yong et al. | |
| 2016/0134531 A1 * | 5/2016 | Assarpour | H04L 49/309 370/392 |
| 2016/0139939 A1 * | 5/2016 | Bosch | G06F 9/45558 718/1 |
| 2017/0099187 A1 | 4/2017 | Dale et al. | |
| 2017/0373990 A1 * | 12/2017 | Jeuk | H04L 69/22 |

OTHER PUBLICATIONS

International Search Report for PCT/US2017/047199 flied on Aug. 16, 2017.

Pushpanjali et al., A Survey on Big Data, Data Mining and Overlay Based Parallel Data Mining, Journal, 2015, p. 1535-1538, vol. 6 (2), International Journal of Computer Science and Information Technologies, India.

J. Halpern & C. Pignataro, Service Function Chaining (SFC) Architecture draft-ietf-sfc-architecture, journal, May 11, 2015, 28pages, Network Working Group.

Kishore Inampudi, Dynamic Service Chaining for NFV/SDN, Presentation, 22 pages, Nov. 23, 2017.

International Search Report for PCT/US2017/047199 filed on Aug. 16, 2017.

* cited by examiner

METHODS AND APPARATUS FOR PROVIDING TRAFFIC FORWARDER VIA DYNAMIC OVERLAY NETWORK

PRIORITY

This application is a continuation application of U.S. patent application Ser. No. 16/107,944, filed on Aug. 21, 2018 in the name of the same inventor and entitled "Methods and Apparatus for Providing Traffic Forwarder via Dynamic Overlay Network," which has been issued into the U.S. Pat. No. 10,630,586, which is a continuation application of U.S. patent application Ser. No. 15/249,127, filed on Aug. 26, 2016 in the name of the same inventor and entitled "Methods and Apparatus for Providing Traffic Forwarder via Dynamic Overlay Network," which has been issued into the U.S. Pat. No. 10,075,373, the disclosures of which are incorporated herein by reference.

FIELD

The exemplary embodiment(s) of the present invention relates to communications network. More specifically, the disclosed embodiment(s) of the present application relates to communication between clouds and devices.

BACKGROUND

In today's modern computing world, more and more components are being virtualized in a cloud environment to save capital expenditure for various entities, such as companies, public institutions, government agencies, individuals, and the like. To improve efficiency while conserving resources, entities are gradually allowing third party providers to maintain cloud infrastructure for hosting subscribers' virtual as well as physical components. A cloud or cloud provider, also known as cloud computing or a cluster of servers, becomes viable when entities need to increase their computing capacity or new features without investing in substantial amount of new infrastructure, personnel, hardware and/or software. It should be noted that typical third party or public cloud infrastructure providers includes, but not limited to, Amazon™, Google™, RackSpace™, Predix™, and the like. For example, a cloud provider supplies cloud computing which can be subscription-based or pay-per-use service accessible over the Internet.

While some components or devices can be virtualized, the physical machines with hardware components are still often placed in the vicinity of premise(s), such as user premises, institutional laboratories, developing/testing sites, and/or manufacturing facilities. With voluminous hardware systems, software systems, and virtual systems coupling to various public clouds and private clouds, the typical network communication becomes more sophisticated and difficult to maintain efficiently. A problem associated with a conventional cloud environment is that multiple hops may be required before reaching to a targeted service component(s) or provider(s).

SUMMARY

One embodiment of the present invention discloses a process capable of facilitating network communication using forwarders or vforwarders connected through an overlay network. The process, in one aspect, is able to receive a packet stream or network traffic from a customer premise equipment ("CPE") using a first point-to-point ("PTP") connection via the overlay network. After identifying the service component able to provide a network function ("NF") indicated by the packet stream, at least a portion of the packet stream is forwarded to the service component via a second PTP connection through the overlay network according to a set of predefined requirements. Upon receipt of the processed packet stream from the service component, the processed packet stream is forwarded to another forwarder or vforwarder via a hop-to-hop ("HTH") link through the overlay network in accordance with the processed packet stream.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus for processing network traffic using forwarders coupled to an overlay network in a cloud environment.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One embodiment of the present invention discloses a network process configured to facilitate network communication between various network services and consumers using forwarders or vforwarders coupled to an overlay network. The process, in one aspect, is able to receive a packet stream or network traffic from a customer premise equipment ("CPE") using a first point-to-point ("PTP") connection via the overlay network. After identifying the service component able to provide a network function ("NF") indicated by the packet stream, at least a portion of the packet stream is forwarded to the service component via a second PTP connection through the overlay network according to a set of predefined requirements. Upon receipt of the processed packet stream from the service component, the processed packet stream is forwarded to another forwarder or vforwarder via a hop-to-hop ("HTH") link through the overlay network in accordance with the processed packet stream.

To simplify forgoing discussion, the term "PTP" is used to describe logical connection between a forwarder and a service component, and the term "HTH" is used to describe logical connection between forwarders. The terms "forwarder" and "Vforwarder" are referred to the same or similar apparatus. In one aspect, Vforwarder (or forwarder) is a VM. Alternatively, Vforwarder is a physical machine. A function of Vforwarder is to route network traffic more directly and efficiently. In one embodiment, Vforwarders are connected through the overlay network situated between CPEs and service components using a hop-to-hop mechanism to navigate the traffic more efficiently.

Figure 1:
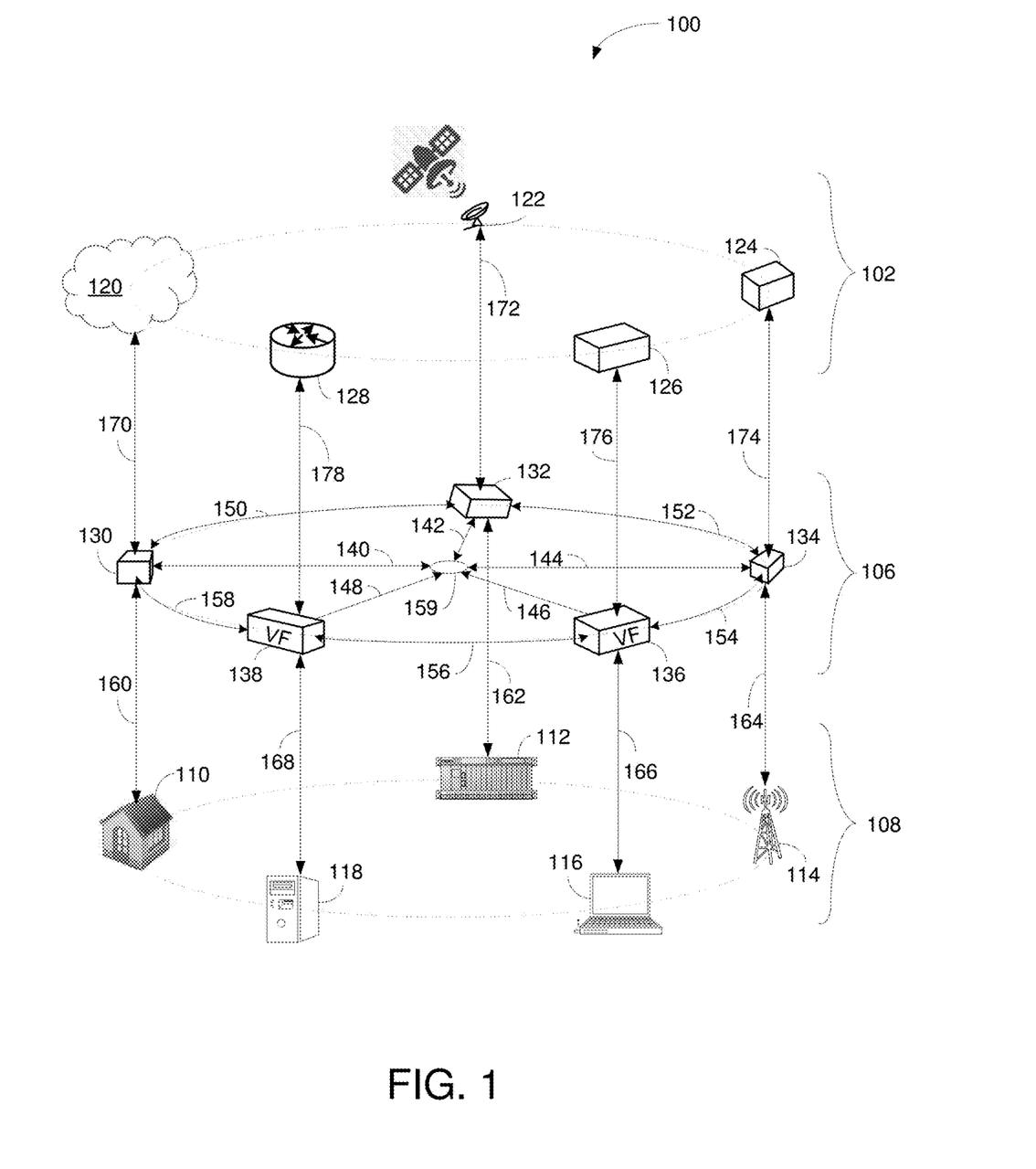
FIG. 1 is a block diagram illustrating an overlay network containing multiple forwarders situated between network components in a cloud environment in accordance with one embodiment of the present invention.

FIG. 1 is a block diagram 100 illustrating an overlay network containing multiple forwarders situated between network components in a cloud environment in accordance with one embodiment of the present invention. Diagram 100 includes a network infrastructure or platform layer or network 102, application layer or network 108, and overlay network 106. Network infrastructure or infrastructure layer 102 includes hardware and software resources providing network connectivity, communication, and operations/management of a communications network. In one example, network infrastructure 102 includes various networking components, such as routers 128, switches 126, satellite hub 122, Internet platform 120, cloud servers 124, and the like. A function of infrastructure layer 102 is to provide network traffic communication between users, processes, applications, services, and the Internet. It should be noted that the underlying concept of the exemplary embodiment(s) of the present invention would not change if one or more blocks (or devices) were added to or removed from diagram 100.

Application layer 108, in one embodiment, includes one or more customer premises equipments ("CPEs") 110, servers 118, portable devices 116, wireless devices 114, and/or cloud emulators 112. CPE 110, in one example, can be a network device or user equipment ("UE") located at users' or subscribers' premises and is connected to a communications network. For example, CPE 110 can be a telephone, router, switch, residential gateway (RG), set-top box, smartphone, and the like. Application layer 108, in one aspect, employing cloud software such as software as a service ("SaaS") facilitates the cloud environment. To access cloud based various applications, devices in application layer 108, in one embodiment, use application interfaces, web browsers, and/or program interfaces to reach various client or consumer devices via Vforwarders.

Overlay network 106, situated between infrastructure layer 102 and application layer 108, is organized to include a group of forwarders or Vforwarders 130-138. Forwarders or vforwarders 130-138, hereinafter referred to as vforwarders ("VFds"), are interconnected via HTH east-west ("EW") channels 140-159. In one embodiment, VFds 130-138 are coupled to various service components and devices 110-128 via PTP south-north ("SN") channels 160-178. A PTP connection such as channel 160 or 178 is a network communication link or connection between two nodes such as VFd 138 and router 128 as a service component via PTP link 178. During an operation, after VFd 138, for example, forwards a packet flow to router 128 via PTP link 178, VFd 138 subsequently receives the result of routing process from router 128 via PTP link 178. Depending on the nature of the packet flow and the result of processing, VFd determines the next hop to reach the next VFd. For example, after receiving the result of packet processing from router 128, VFd 138 hops to VFd 130 or forwarding the traffic to VFd 130 whereby the traffic or packet flow reaches the Internet 120 via PTP channel 170.

An overlay network can be considered as a communication network or a computer network which is established on top of another network. For example, a secure overlay network resides on top of another existing network such as the Internet. Nodes in the overlay network are considered as being connected by virtual, physical, and/or logical links. Each link may correspond to a path which facilitates a traffic flow to travel through physical or logical links.

Diagram 100 illustrates a network layout containing multiple CPEs 110-118, service components 120-128, and VFds 130-138 capable of improving network efficiency using PTP VFds. CPEs 110-118 are able to access the communications network via PTP connections. Service components 120-128, in one example, provide various NFs for routing and processing incoming packet streams. Overlay network 106, in one aspect, is organized with multiple interconnected VFds and is used to link between CPEs 110-118 and service components 120-128. Every VFd, in one embodiment, includes at least one lookup table containing a set of HTH links used for hoping between VFds 130-138.

Each VFd, in one embodiment, includes a function definition table indicating various functions associated with various service components such as router 128. For instance, VFd such as VFd 138 includes a service directory table indicating addresses associated with various service components. VFd 132, in one example, includes at least one PTP port used to connect to a PTP connection such as PTP connector 172 for communicating with service component 122. Note that VFd is operable to forward a packet stream to one of service components point-to-point based on a predefined requirement of load balance.

VFds 130-138, in an exemplary embodiment, are configured in such a way that each VFd is one hop away from any other VFd. For example, a packet stream at VFd 136 can hop to VFd 132 via HTH connections 142 and 146 via a hop connector 159. In one embodiment, VFds 130-138 can be hardware systems, virtual machines ("VMs"), or a combination of hardware systems and VMs. One advantage of using VFds 130-138 organized in overlay network 106 is that it can enhance overall performance in a cloud computing environment.

A cloud or cloud environment is cloud computing which includes a cluster of servers residing in one or more clouds. The servers in the cloud are able to support or host multiple VMs running simultaneously. Cloud computing basically uses various resources including hardware, firmware, and software to deliver computing service. A benefit of using a cloud is that it shares resources with other users so that resources can be used more efficiently. Another benefit of using a cloud is that it is able to dynamically reallocate resources on demand.

A cloud can be a private cloud, a public cloud, or a hybrid cloud. A private cloud such as overlay network 106 or infrastructure layer 102 can be operated for a purpose of an individual corporation, organization, and/or entity. The private cloud, in one example, can provide cloud-computing services over a network. Note that a private cloud can be managed or hosted internally, externally, or both. A public cloud is open to the public providing computing services over a communication network. A public cloud, which is also known as community cloud, can be free or based on a fee schedule in exchange of clouding service. For example, exemplary public cloud services providers can be Amazon web services (AWS)™ Microsoft™, Apple™, and/or Google™ and are able to host services across the Internet. In one example, infrastructure layer 102 or a portion of infrastructure layer 102 may be operated by a public cloud.

A VM is a software implementation of a particular computer system that processes tasks like a real physical machine. For instance, VM can be configured to execute instructions in a way that follows the emulated computer architecture. A server or a cluster of servers containing specialized hardware and software may be used to provide a VM environment that allows multiple VMs to be operated simultaneously. VM includes system virtual machines and process virtual machines. The system virtual machine includes a set of functions operating based on an operating system. The process virtual machine is able to execute a program based on platform-independent program execution environment. Instance means a VM configured to execute program based on the emulation of a real machine or apparatus.

An advantage of using VFds organized in an overlay network is that while VFds are invisible to the network functions, VFds can also provide load balance between the service components whereby the overall network performance can be improved.

Figure 2:
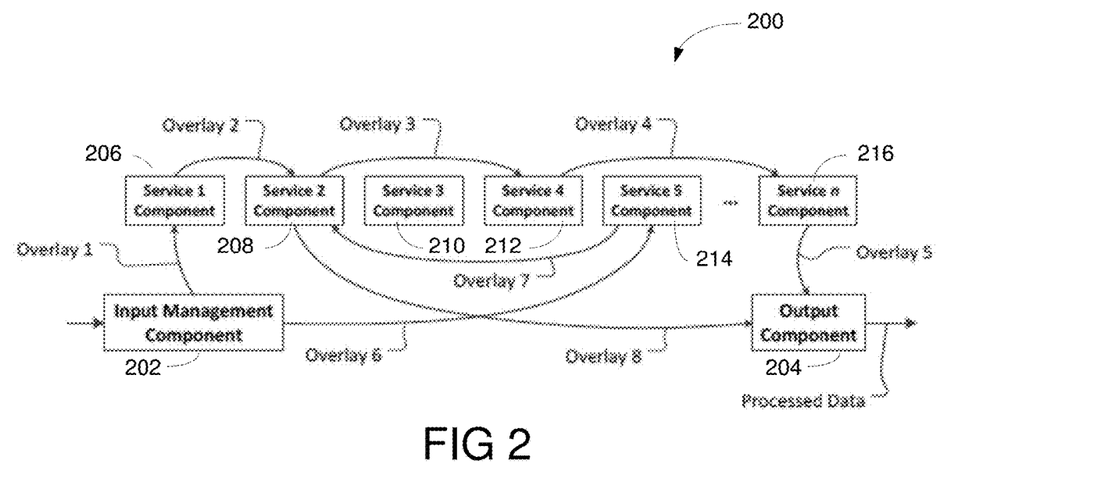
FIGS. 2-3 are block diagrams illustrating exemplary processes using overlay links between input/output ("I/O") components and service components in accordance with one embodiment of the present invention.

FIG. 2 is a block diagram 200 illustrating an exemplary process using overlay links between input/output ("I/O") components and service components in accordance with one embodiment of the present invention. Diagram 200 includes service components 206-216, input management component 202, output component 204, and eight (8) overlay links. Diagram 200 illustrates a process of Function A and Function B defined and referenced in the tables such as a functional definitions table and services directory table. It should be noted that the underlying concept of the exemplary embodiment(s) of the present invention would not change if one or more blocks (or components) were added to or removed from diagram 200.

In operation, upon receiving a request indicating Function A, a service chain, including service 1 component 206 followed by service 2 component 208 followed by service 4 component 212 followed by service n component 216, is established and managed by a function translation component, not shown in FIG. 2. The function translation component, in one example, provides foregoing services to a service translation component, not shown in FIG. 2. The service translation component, for instance, looks up corresponding information for each of those services in a services directory table and subsequently passes the information to an overlay component. The overlay component, in one embodiment, uses the information of services to create an operation of service chain. For example, upon a first overlay (or overlay 1) from input management component 202 to service 1 component 206, a second overlay (or overlay 2) is established from service 1 component 206 to service 2 component 208. After a third overlay (or overlay 3) from service 2 component 208 to service 4 component 212, a fourth overlay (or overlay 4) is connected from service 4 component 212 to service n component 216. A fifth overlay (or overlay 5) is created from service n component 216 to output component 204.

Note that the information obtained from the service translation component provides information, such as keys, directions, et cetera, for making the connections via the overlays. For example, the information may enable the overlay component to create multiple overlays passing through firewalls at one or more service components.

Alternatively, the overlay information relating to Function B, including service 5 component 214 followed by service 2 component 208, is stored in the function definitions table. Upon receipt of a request of Function B, the overlay component creates overlays 6, 7, and 8 to produce the processed data as illustrated in diagram 200.

Figure 3:
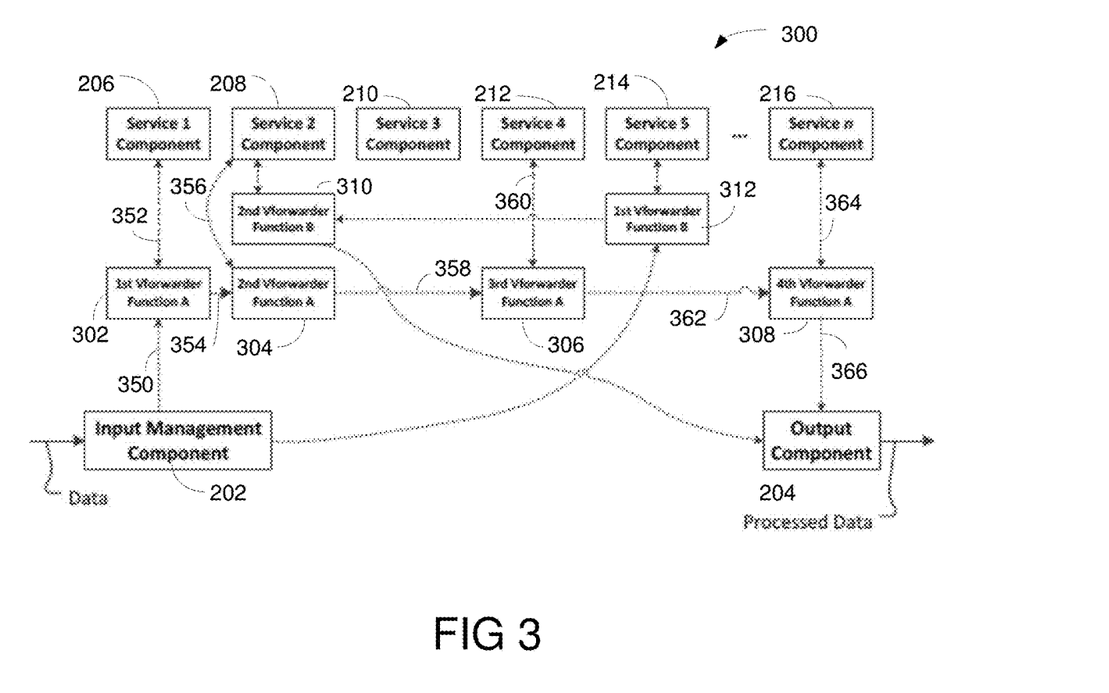

FIG. 3 is a block diagram 300 illustrating an exemplary overlaying operation using VFds in accordance with one embodiment of the present invention. Diagram 300 is similar to diagram 200 shown in FIG. 2 except that diagram 300 includes VFds 302-312 and links 350-366 wherein links 350-366 includes HTH connections and PTP links. Diagram 200 illustrates a process of Function A and Function B which is defined and referenced multiple tables such as functional definitions table and services directory table. It should be noted that the underlying concept of the exemplary embodiment(s) of the present invention would not change if one or more blocks (or devices) were added to or removed from diagram 300.

In one embodiment, diagram 300 illustrates an example of creating the overlays utilizing "Vforwarders" or VFds 302-312. Each VFd can be configured to send received data or packet flows to a particular service component such as service 2 component 208 and then, upon receiving the processed data back from the service component such as service 2 component, VFd such as VFd 304 forwards the processed data to another VFd such as VFd 306. The VFds interconnecting information, in one aspect, is included in one or more routing tables. In one embodiment, the overlay component can create VFd(s) based on network application, and becomes part of control plane of a virtual network.

As shown in FIG. 3, Function A can be carried out by four VFds 302-308. For example, VFd 302 (or $1^{st}$ Vforwarder) for performing Function A routes its incoming data to service 1 component 206, and routes returned data or processed data from service 1 component 206 to VFd 304 (or $2^{nd}$ Vforwarder). Note that input management component 202 sends incoming data corresponding to Function A to VFd 302 (or $1^{st}$ Vforwarder). Alternatively, VFd 302 (or $1^{st}$ Vforwarder) is configured to intercept incoming data at input management component 202 corresponding to Function A. VFd 304 (or $2^{nd}$ Vforwarder) routes received data to service 2 component 208, and subsequently routes data returned (or processed data) from service 2 component 208 to VFd 306 (or $3^{rd}$ Vforwarder). VFd 306 (or $3^{rd}$ Vforwarder) facilitates to route the received data to service 4 component 212, and subsequently routes the returned data from service 4 component 212 to VFd 308 (or $4^{th}$ Vforwarder). VFd 308 (or $4^{th}$ Vforwarder) is configured to route received data to service n component 216, and route data returned from service n component 216 to output component 204.

Figure 4:
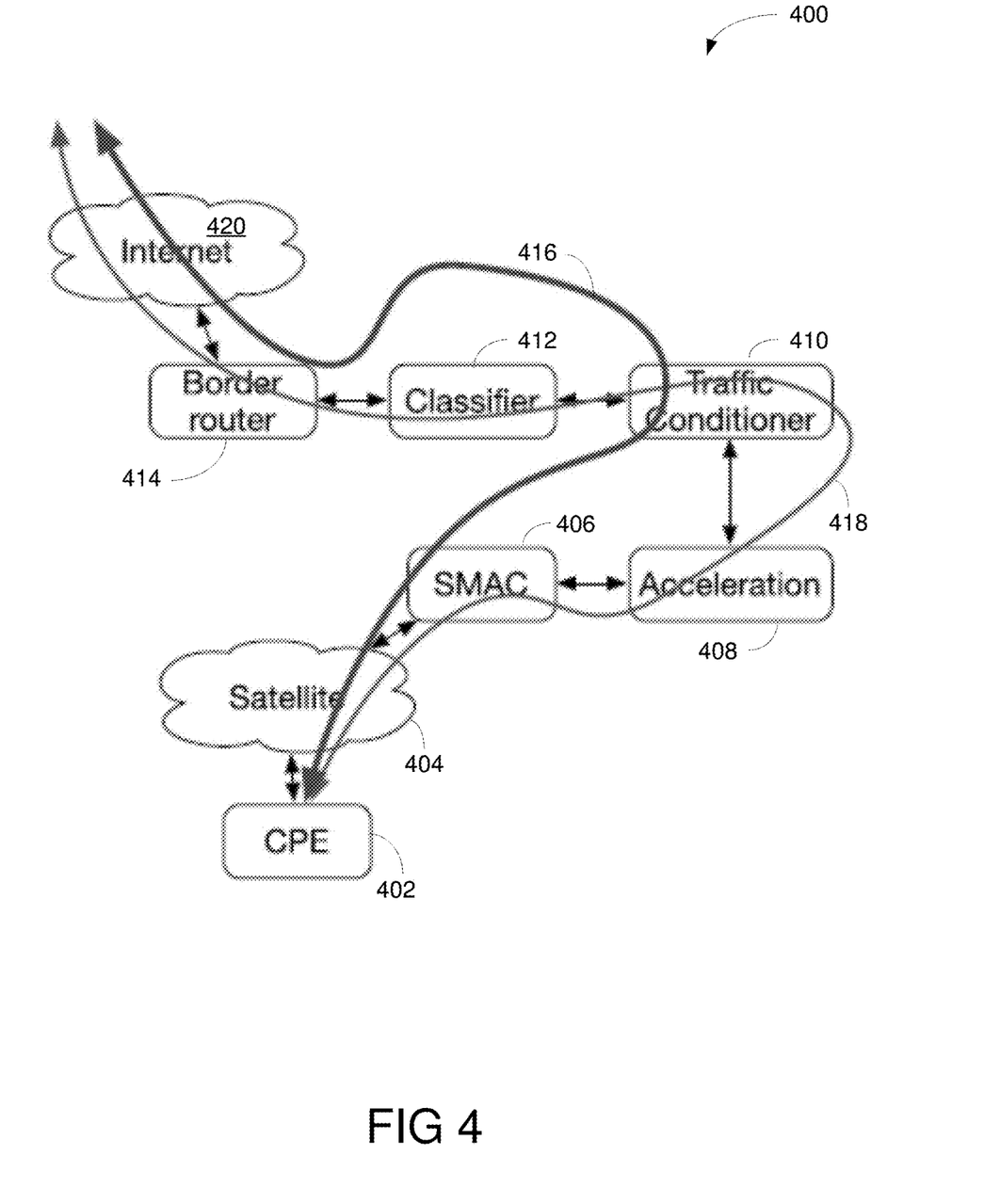
FIG. 4 is a block diagram illustrating an exemplary network communication between components using forwarders and overlay network in accordance with one embodiment of the present invention.

FIG. 4 is a block diagram 400 illustrating an exemplary network operation between components using forwarders and overlay network in accordance with one embodiment of the present invention. Diagram 400 includes a CPE 402, SMAC 406, acceleration 408, traffic conditioner 410, classifier 412, border router 414, and Internet 420. In one embodiment, a network controller uses VFd and overlay network to generate a dynamic service chaining based on CPE and/or traffic flow to enhance network performance. It should be noted that the underlying concept of the exemplary embodiment(s) of the present invention would not change if one or more components (or devices) were added to or removed from diagram 400.

In one embodiment, VFds organized by overlay network enables to establish a dynamic service chaining. The dynamic service chaining provides various forwarding decisions based on CPE and/or individual traffic flow (or packet stream). For example, traffic path 416 follows a different path than a more traditional path 418 through the network when the flow is already classified. Since the flow or traffic flow is not TCP (Transmission Control Protocol), acceleration or acceleration component 408 can be skipped. The static service chain, in contrast, creates a path 418 allowing the packets flow to pass through every component as such components 404-414. Dynamic service chaining using VFds, point to point access, hop to hop connection, and overlay network to optimize efficiency of packet flow(s) through a network. An advantage of using the dynamic service chaining is that it can dynamically insert or remove one or more service components along the static service chain path. For service insertion, an NF, for example, can explicitly request traffic to match with certain predefined criteria before redirecting. For service removal, an NF can, for example, explicitly request to skip according to certain criteria.

For example, acceleration 408 can request all UDP (User Datagram Protocol) traffic to skip acceleration 408. VFd tables at traffic conditioner 410, in one aspect, can be programmed for packets to be sent to SMAC for FN. Similarly, VForwarder tables at SMAC may be programmed for packets to be sent to traffic conditioner 410 for all UDP traffic. Dynamic service chaining, in one example, requires application level integration. A way to implement dynamic service chaining independently from IaaS is to implement the overlay scheme. For example, after a packet is first decapsulated, header fields of packet(s) are looked up.

An advantage of using dynamic service chaining is that it can dynamically add and/or remove services. Another benefit of using dynamic service chaining is that it can locate and remove failed nodes or service components.

Figure 5A:
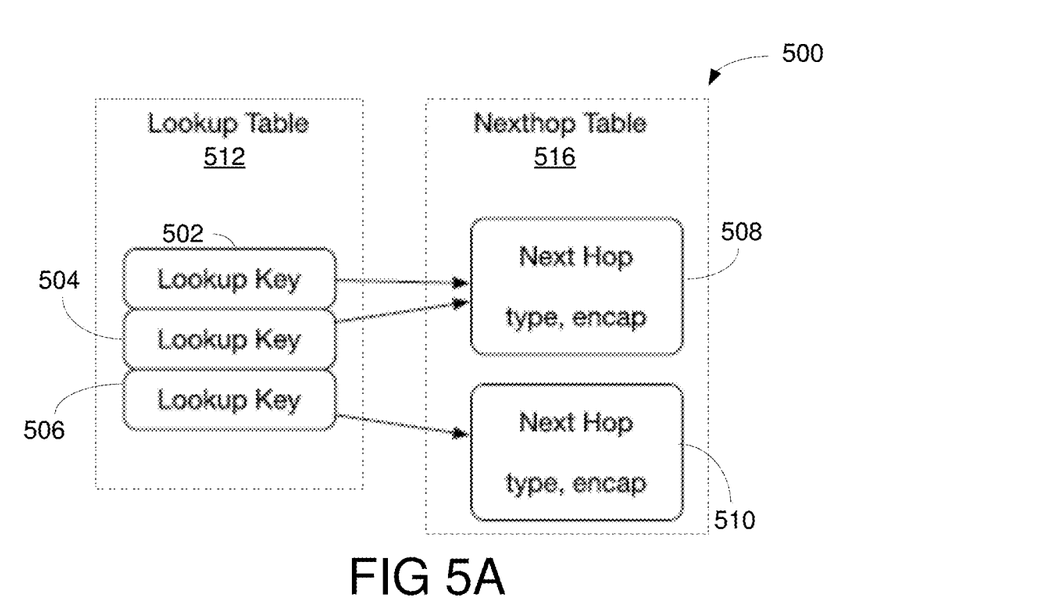
FIGS. 5A-B are block diagram illustrating exemplary tables and forwarders in accordance with one embodiment of the present invention.

FIG. 5A is a block diagram 500 illustrating exemplary forward table identifying next hop in accordance with one embodiment of the present invention. Diagram 500 includes a lookup table 512 and a next-hop table 516. In one aspect, lookup table 512 includes lookup keys 502-506 which point to next hops 508-510. For example, a forwarding device or VFd uses a key to lookup table 512 which will result a next-hop. The key can be a MAC address for L2 devices or an IP address for L3 devices. The next hop can be a MAC address or a VXLAN tunnel. Tables 512-516, in one embodiment, are programmed by an entity in the control plane such as network orchestrator or network manager.

Figure 5B:
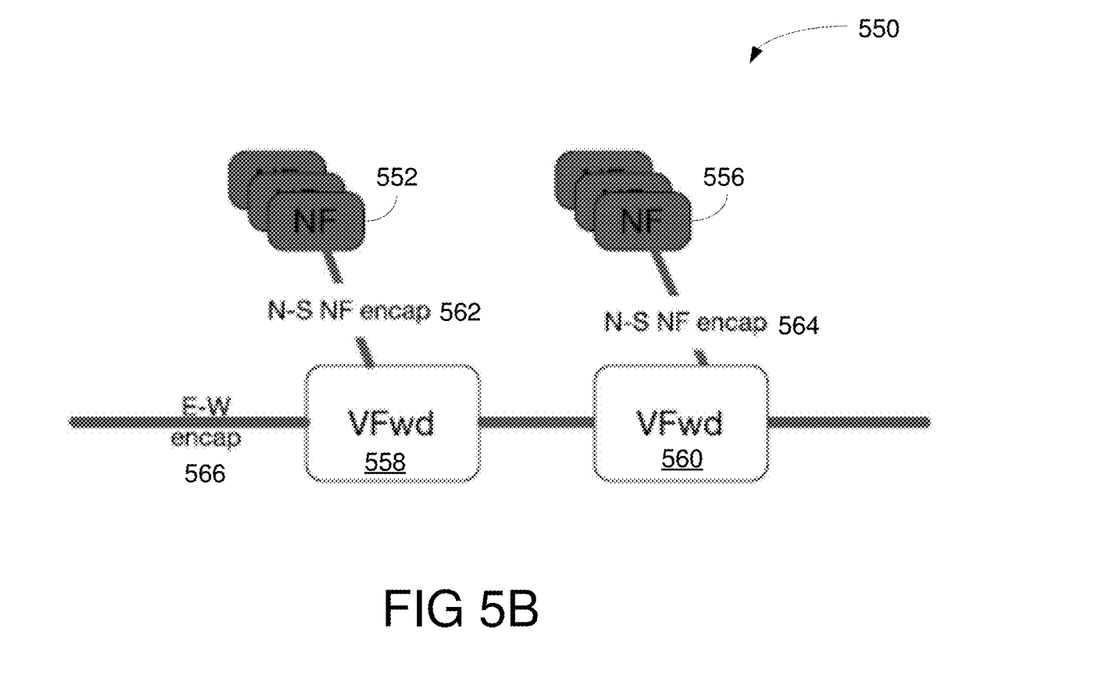

FIG. 5B is a block diagram 550 illustrating exemplary forwarders or VFds in accordance with one embodiment of the present invention. Diagram 550 includes VFds 558-560, NFs 552-556, and links 562-566. In one aspect, the network functions such as NFs 552-556 are connected together using VFd based dynamic service chain. Depending on the applications, VFd can be implemented as a kernel module as part of the hypervisor. Alternatively, VFd can be an application integrated with a third party forwarding stack (6wind) or resides in a VM in a cloud environment.

Each VFd has two types of interfaces, namely East-West ("EW") path or link and North-South ("NS") path or link. EW path handles or carries traffic that comes from another VFd which is a hop-by-hop encapsulated overlay. Each E-W link or interface can be different. For example, a different overlay tunnel encapsulation can be created in place of VXLAN. NS link or encapsulation facilitates network traffic from a forwarder node to an FN node. The NF node can be a virtual or physical machine.

Figure 6A:
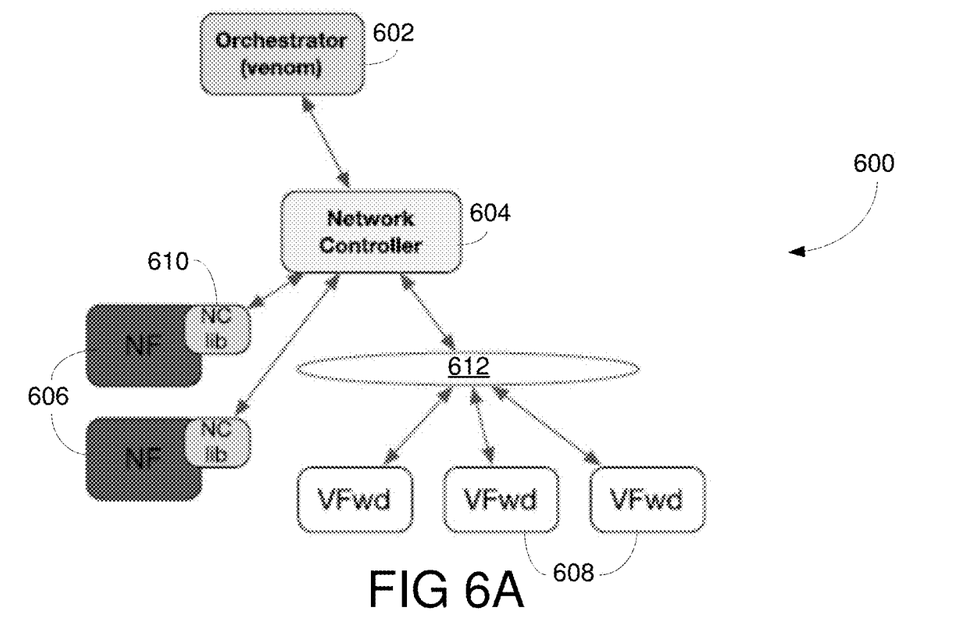
FIGS. 6A-B are block diagrams illustrating network controller and vforwarders in accordance with one embodiment of the present invention.

FIG. 6A is a block diagram 600 illustrating network controller and VFds in accordance with one embodiment of the present invention. Diagram 600 includes an orchestrator 602, network controller 604, NF 606, and VFd 608. Orchestrator 602 arranges, coordinates, and manages one or more virtual networks ("VNs") based on users' requests. In addition to virtualization, orchestrator 602 is able to provide other network related functions, such as provisioning, workflows, flexible resource allocation, billing, metering, accounting, policies, and user interfaces. To improve network performance, orchestrator 602, in one embodiment, is able to scale up or scale down based on demand based on the performance of VN. The terms "orchestrator," "network orchestrator," and "orchestrator of network," mean the same apparatus and they can be used interchangeably.

Each of NFs 606 is assigned to a lookup table so that its load distribution can be managed through the forwarding process. NFs 606, in one example, are in a cluster or group. The traffic for a particular flow needs to get to the right NF Virtual/Physical Entity. VFd lookup table, in one example, may be used to load requests amongst individual members of the NF cluster. Affinity based load balancing has to be facilitated by the NF cluster master via entries at the previous hop.

Diagram 600 also includes a network controller protocol 612 which is a distribution protocol used for forwarding network traffic. In one aspect, VFd tables are programmed based on forwarding advertisements from NFs. Network controller 604 monitors status of corresponding NFs and publishes withdraw messages when an NF(s) becomes unavailable.

Figure 6B:
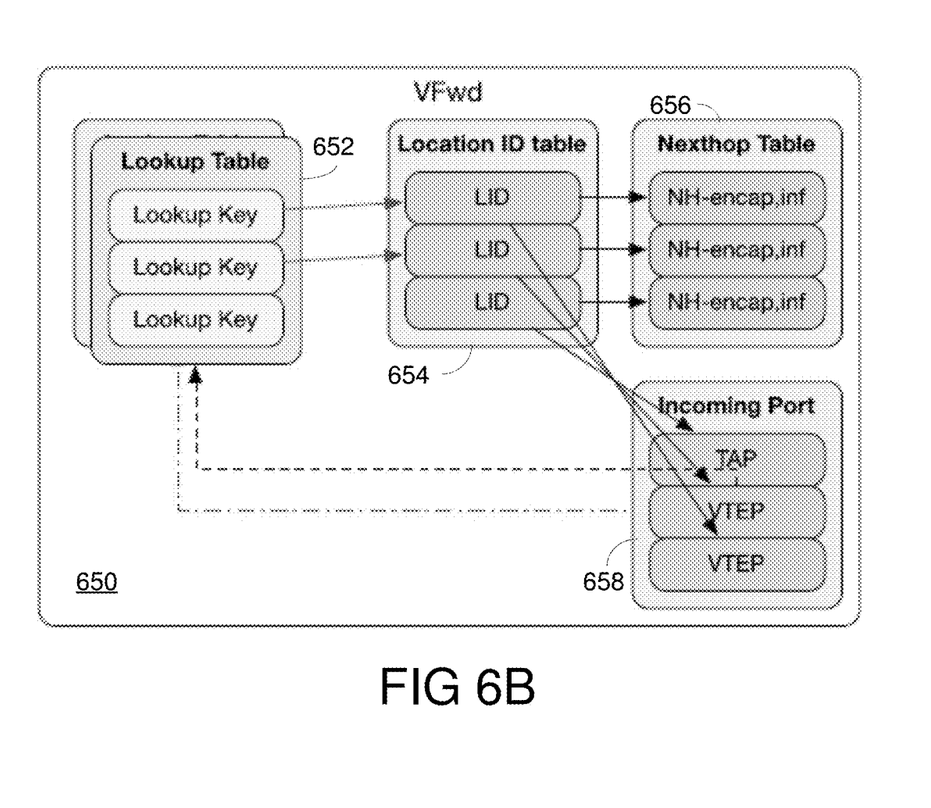

FIG. 6B is a block diagram illustrating an exemplary VFd table 650 in accordance with one embodiment of the present invention. Table 650 includes a lookup table 652, location ID table 654, nexthop table 656, and incoming port 658. Table or forwarding table 650 which resides in VFd is used for traffic forwarding. The following table illustrates exemplary content in a VFd table such as table 650.

| | Data Owner | Contents | Description |
|---|---|---|---|
| Lookup Table | Network function - VWA/VASN etc | Lookup Key, Value pairs: CPE IP addresses, CPE subnets, Flow - 5 tuples, MAC addresses | Each network function programs its own Location ID based lookup table. |
| Location ID table | Venom (network controller) | Just an abstract ID | Passed from Venom to each of the NFs. They communicate the Lookup Key to the LocationID mapping. |
| NextHop Table | Venom Network Controller (in conjunction with IaaS) | For each LocationID, the encapsulations needed (VXLAN, IPS EC . . .) to get to that location from anywhere | This is the actual encap put on the packet when its designed to go to another NF or VFwder |
| Incoming port | Venom (Network controller) | The incoming interface that is connected to the VForwarder - VXLAN, Tap, VLAN etc | This is used to identify what lookup table is to be used to do the next lookup. |

Figure 7:
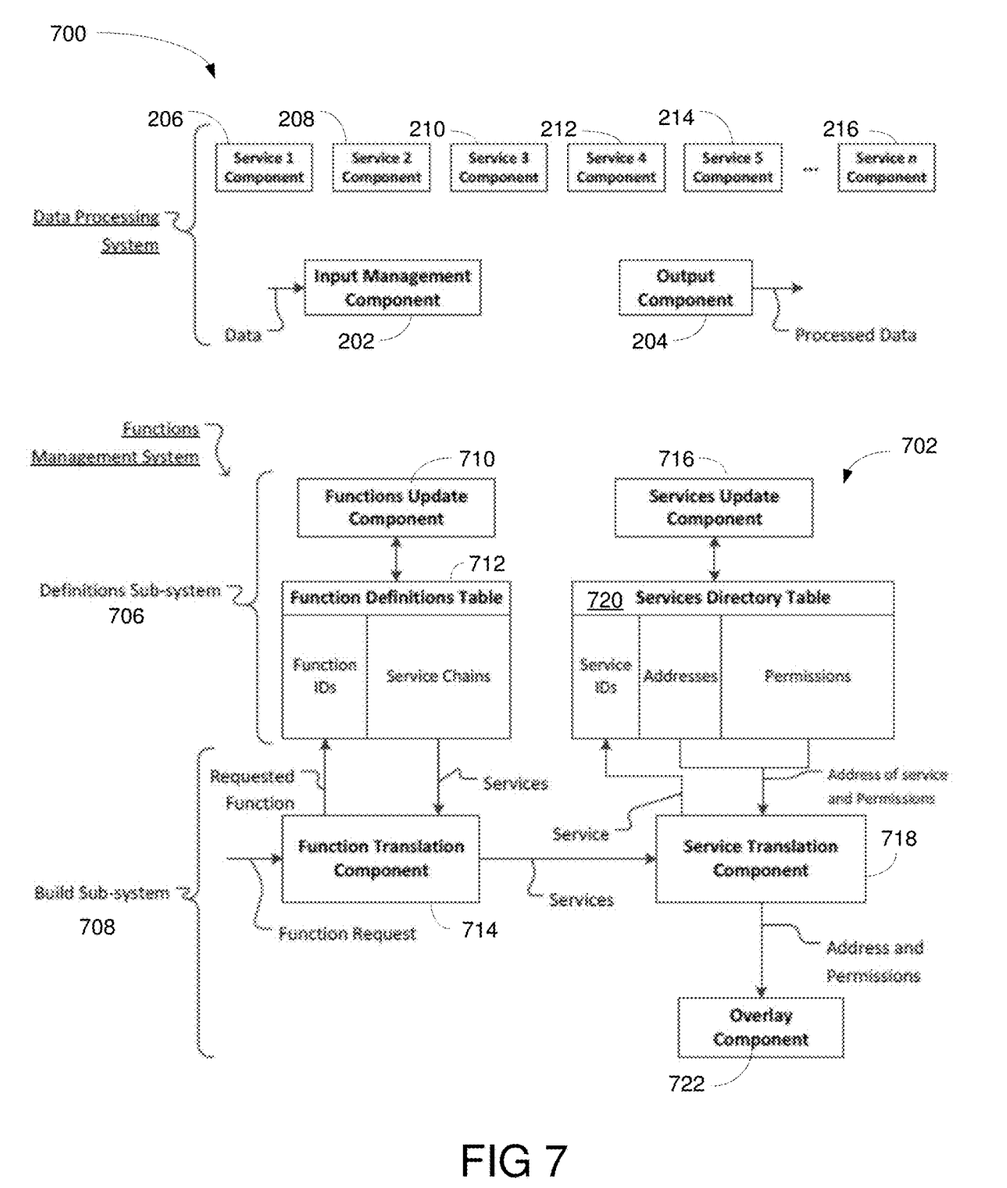
FIG. 7 is a block diagram illustrating an exemplary forwarding process using tables in accordance with one embodiment of the present invention.

FIG. 7 is a block diagram 700 illustrating an exemplary forwarding process using tables in accordance with one embodiment of the present invention. Diagram 700 includes a data processing system, definition sub-system 706, and build sub-system 708. Note that the data processing system is similar to the system shown in diagram 200 of FIG. 2. Definition subsystem 706 includes functions update component 710, services update component 716, function definitions table 712, and services directory table 720. Build sub-system 708 includes a function translation component 714, service translation component 718, and overlay component 722. It should be noted that the underlying concept of the exemplary embodiment(s) of the present invention would not change if one or more blocks (or tables) were added to or removed from diagram 700.

The data processing system includes an input management component 202 for receiving data (e.g., in the form of packets), an output component 204 for outputting the processed data, service components 206-216 for providing various functions. Each service component is configured to provide a particular service (e.g., a particular data processing) for data received at input management component 202.

In one embodiment, a function management system includes a definitions sub-system 706 and a build sub-system 708. Definitions sub-system 706 includes a services directory table 720, a functional definitions table 712. Services directory table 720, in one example, stores information identifying and defining available services (e.g., Service Components deployed in the data processing system). For example, a service identifier identifies a service based on information contained in tables 712 or 720. Table 720, for example, contains an address of an input port for a service component within the data processing system. Permissions and/or restrictions on any service(s) (e.g., list(s) of other services with which the service can (or cannot) communicate) can also be listed in table 720. Table 720, in one aspect, contains keys or other information allowing a connection to be made through a service component's firewall for quick access with minimal authentication.

Function definitions table 712, in one embodiment, stores information identifying and defining available functions that can be performed by the data processing system for the data received by input management component 202. For example, a function identifier uniquely identifies a function.

A dynamic service chain (e.g., a sequence of a sub-set of the services in the services directory table) for performing the function can be included in table 712. It should be noted that definitions sub-system 706 also includes a functions update component for adding, deleting, and/or modifying functions.

Build sub-system 708 includes function translation component 714, service translation component 718, and overlay component 720. Function translation component 714, in one aspect, receives a function request and retrieves corresponding service chain from function definitions table 712 in accordance with the function request. The function request can also identify the data to be processed in accordance with the requested function.

Service translation component 718 is configured to receive a service chain from function translation component 714 and, for each service, component 718 retrieves information corresponding to the service from services directory table 720. Overlay component 722, in one aspect, receives data from service translation component 718 for carrying out requested services. Note that multiple connections (e.g., network overlays) may be created from input management component 202 through a sequence of services to output component 722.

Figure 8:
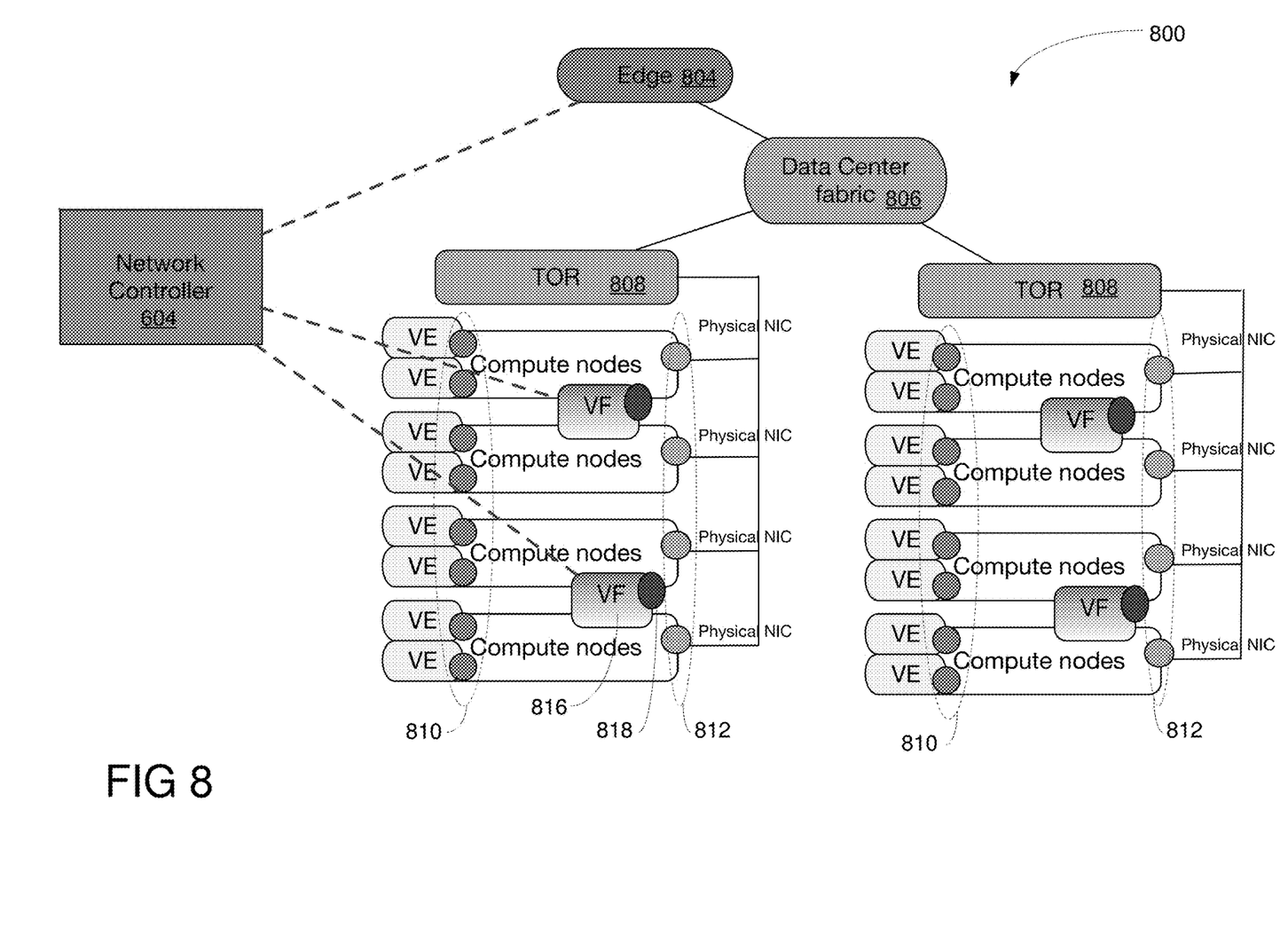
FIG. 8 is a block diagram illustrating a VFd infrastructure using forwarders and network controller in accordance with one embodiment of the present invention.

FIG. 8 is a block diagram 800 illustrating a VFd infrastructure using VFds and network controller in accordance with one embodiment of the present invention. Diagram 800 includes a network controller 604, edge router 804, data center 806, Tor (The Onion Router) 808, and VFds 816. While data center 806 manages cloud data storage, Tor is used to manage network traffic through worldwide, private, and/or public networks. To manage virtual entities ("VEs"), an infrastructure overlay or overlay network 810 is used to communicate with VEs. Network controller 604, in one aspect, builds a dynamic service chaining overlay 818 to manage VFds 816. To communicate with data center 806, VFds 816 establish underlay component 812 to communicate with Tor 808. It should be noted that the underlying concept of the exemplary embodiment(s) of the present invention would not change if one or more blocks (or devices) were added to or removed from diagram 800.

Figure 9:
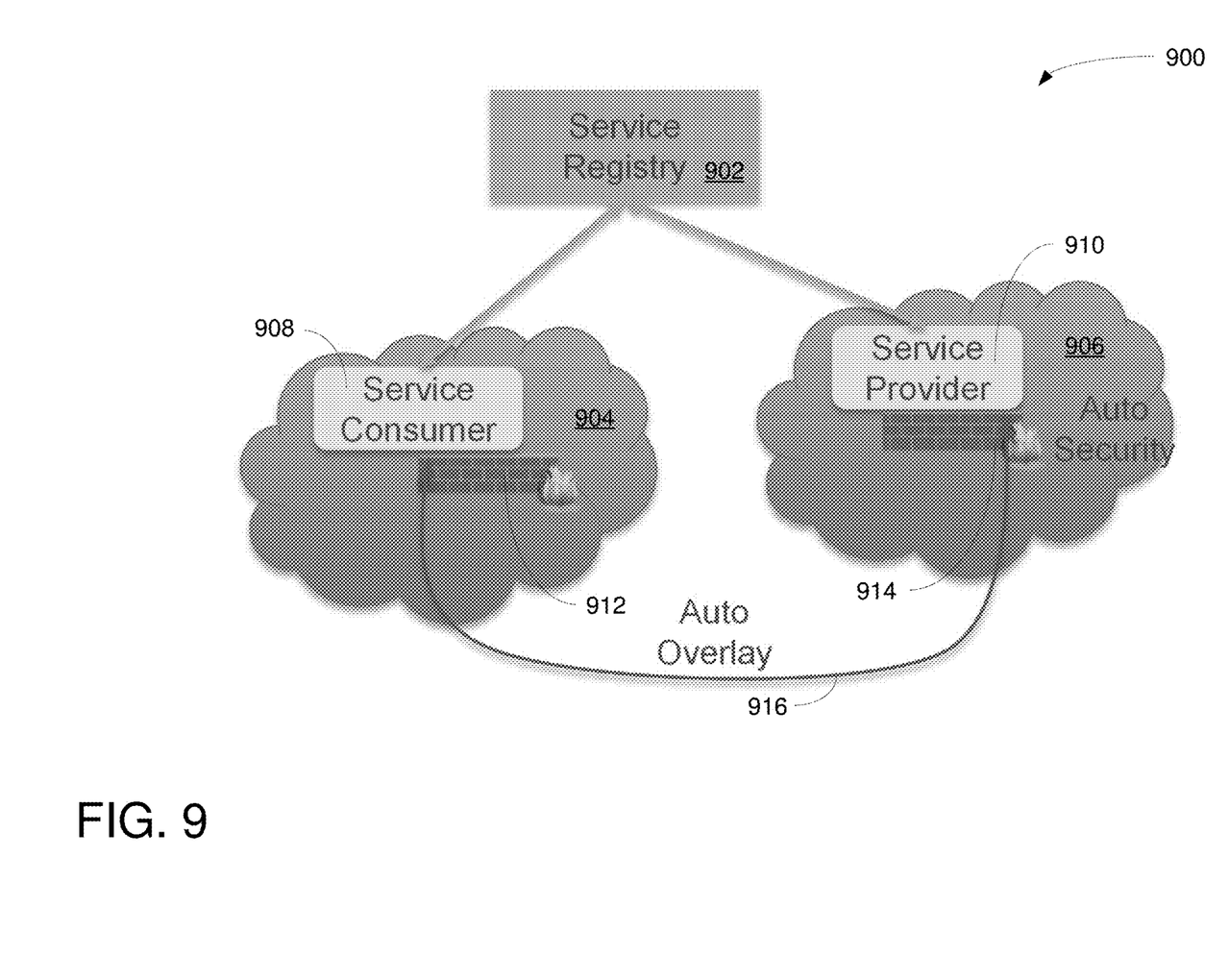
FIG. 9 is a block diagram illustrating an overlay network to pass through firewalls between clouds in accordance with one embodiment of the present invention.

FIG. 9 is a block diagram 900 illustrating an overlay network to pass through firewalls between clouds in accordance with one embodiment of the present invention. Diagram 900 includes a service registry 902, public cloud 904, and private cloud 906. While public cloud 904 includes service consumer 908, private cloud 906 includes service provider 910. To secure network, firewalls 912-914 are created in clouds 904-906, respectively. To provide an automatic and smooth communication, an overlay component is used to establish an automatic ("auto") overlay channel 916. It should be noted that the underlying concept of the exemplary embodiment(s) of the present invention would not change if one or more blocks (or devices) were added to or removed from diagram 900.

The overlay component, in one embodiment, employs one or more VFds for automatic opening firewalls once auto overlay channel 916 is established. A function of auto overlay channel 916 is to facilitate network communication efficiently and smoothly between clouds 904-906 with minimal authentication. For example, upon identifying cloud 906 containing firewall 914 and cloud 904 having firewall 912, the overlay component, which can be managed and/or operated by the network controller or network orchestrator, is able to establish an auto overlay channel 916 between clouds 904-906 using service discovery as well as registration. In one aspect, auto overlay channel 916 generates openings at firewalls 912-914 in response to the service registration for facilitating data passage more freely and quickly between clouds 904-906. For example, upon initial authentication and registration in service registry 902, an auto overlay channel 916 is established. After establishing auto overlay channel 916, subsequent authentication for data transmission and/or transfer between firewall protected clouds 904-906 will be minimized.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 10:
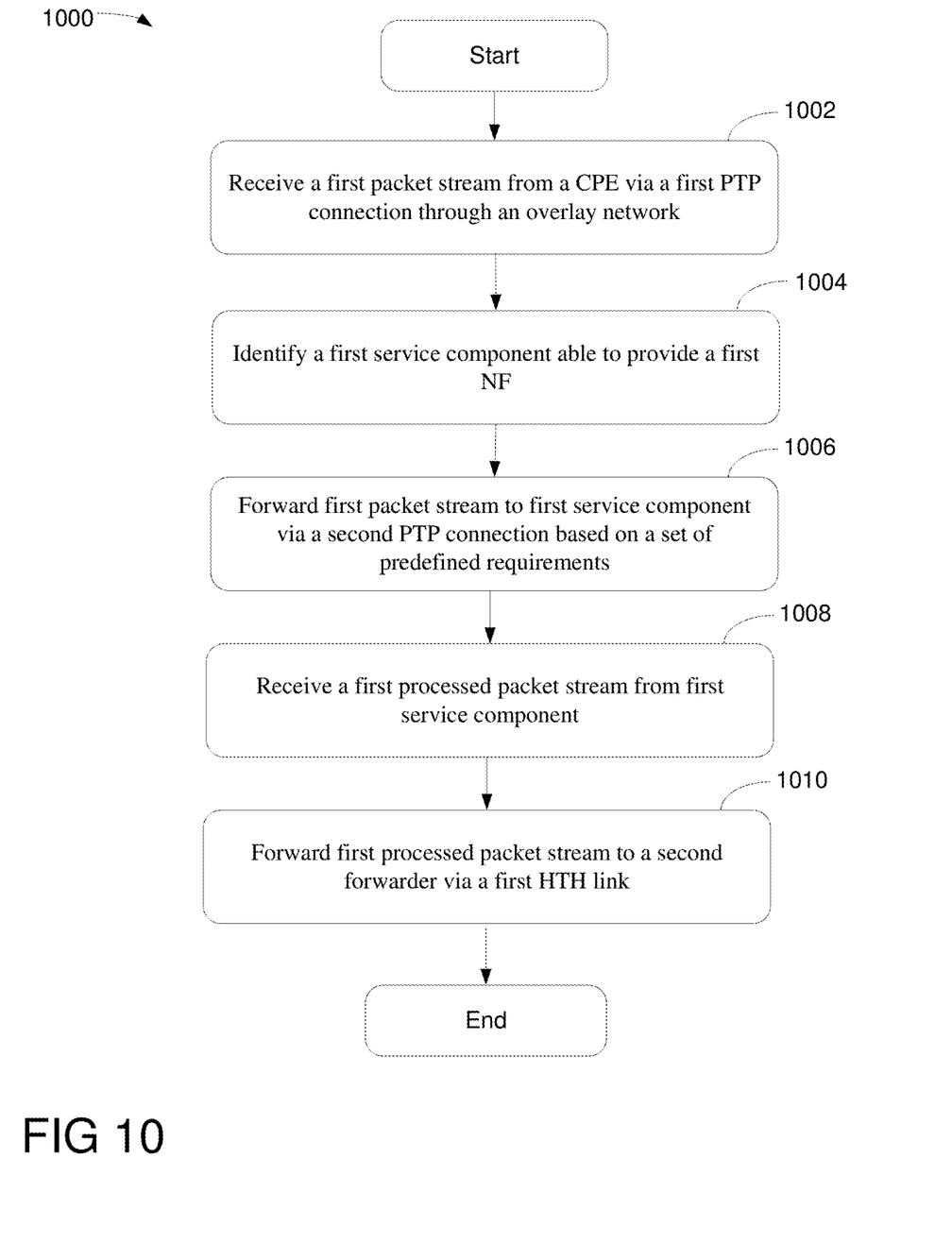
FIG. 10 is a flowchart illustrating an exemplary process of forwarding traffic using an overlay network in accordance with one embodiment of the present invention.

FIG. 10 is a flowchart 1000 illustrating an exemplary process of forwarding traffic using an overlay network in accordance with one embodiment of the present invention. At block 1002, a network forwarding process facilitating network communication including traffic routing and forwarding receives a first packet stream from a CPE via a first PTP connection or link through an overlay network. For example, a packet, packet flow, or traffic flow initiated by a portable device is obtained via a virtual network built on top of a communications network. The virtual network, for example, is able to facilitate direct connection between a network device such as a server in a first cloud and a service component such as VM in a second cloud.

At block 1004, the process identifies a first service component able to provide a first NF based on the first packet stream. For example, the process locates a server able to perform a function of packet classification according to the content of the first packet stream. In one aspect, the process is also capable of determining types of NFs required to process the first packet stream in accordance with a predefined content in a lookup table. The lookup table or tables, in one example, can be stored in a VFd or a network controller.

At block 1006, the process, in one embodiment, forwards at least a portion of the first packet stream to the first service component via a second PTP connection through the overlay network based on a set of predefined requirements. For example, selecting one of the VMs capable of providing first FN is selected based on a predefined load balancing requirement. Alternatively, one of the VMs capable of providing first FN is selected according to a predefined Internet Protocol ("IP") security requirement.

At block 1008, the process receives the first processed packet stream which is the processing result of the first packet stream from the first service component via the second PTP connection. For example, after generating a classification result by the first service component such as a classifier service component based on the first packet stream, the process is able to return the classification result back to a first forwarder or $1^{st}$ VFd.

At block 1010, the process forwards the first processed packet stream to a second forwarder or $2^{nd}$ VFd via a first HTH link or channel through the overlay network in accordance with the first processed packet stream. For example, after receiving the first processed packet stream from the first forwarder via the first HTH link through the overlay network, the second service component able to provide the second NF in accordance with the first processed packet stream is identified by the $2^{nd}$ VFd. Upon forwarding at least a portion of the first processed packet stream to the second service component via a third PTP connection through the overlay network, the second processed packet stream in response to the first processed packet stream is received by the $2^{nd}$ VFd from the second service component via the third PTP connection. The process, in one embodiment, forwards the second processed packet stream to a third forwarder or $3^{rd}$ VFd via a second HTH link through the overlay network in accordance with the second processed packet stream. In one example, the $2^{nd}$ VFd can be identified based on the content of the first processed packet stream and the $3^{rd}$ VFd is determined according to the content of the second processed packet stream. In one embodiment, identifying the next VFd is partially based on a set of predefined requirements such as load balancing, security requirements, and the like.

Figure 11:
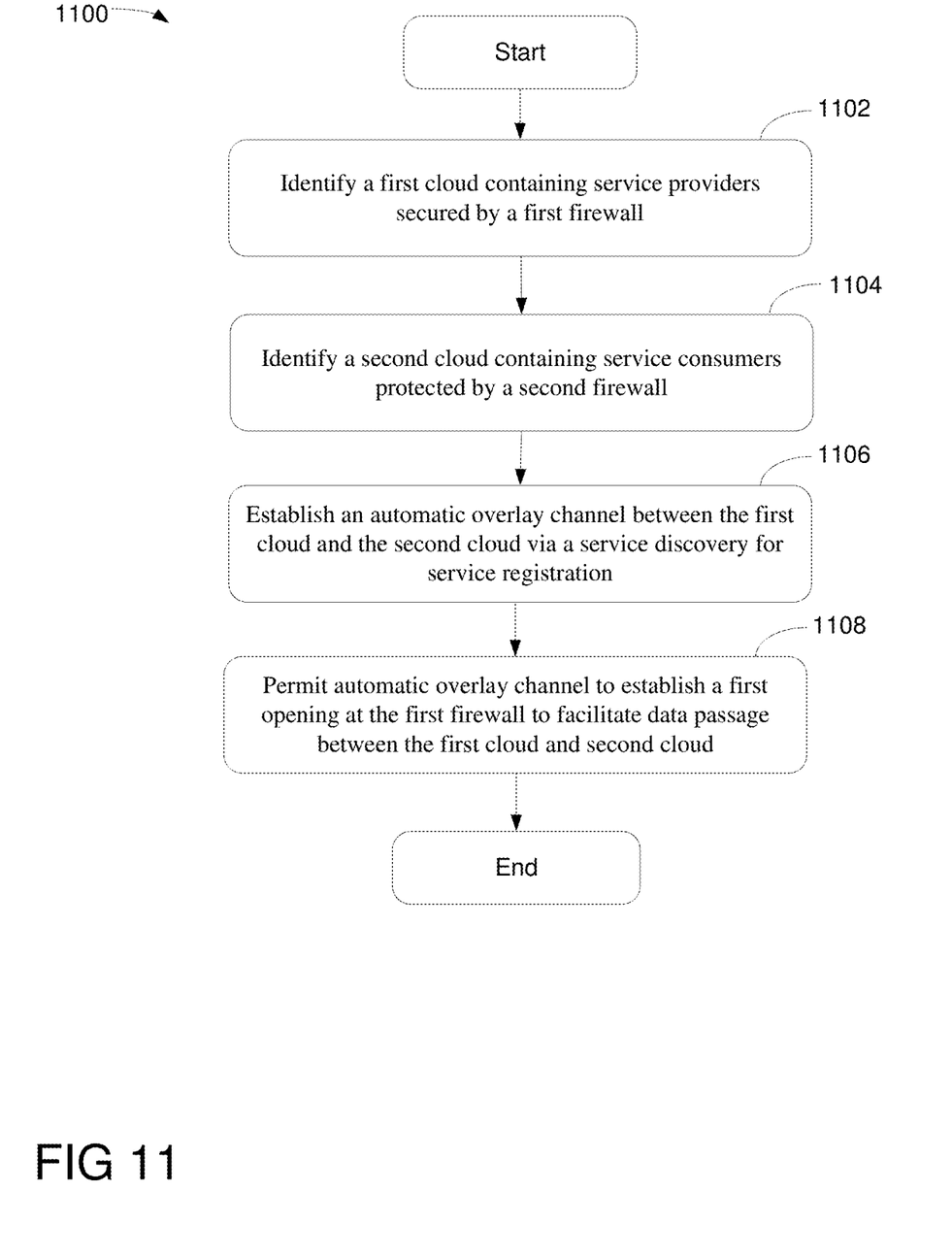
FIG. 11 is a flowchart illustrating an exemplary process of tunneling through firewalls using an overlay network in accordance with one embodiment of the present invention.

FIG. 11 is a flowchart 1100 illustrating an exemplary process of tunneling through a firewall(s) using an overlay network in accordance with one embodiment of the present invention. At block 1102, a process for facilitating network communication identifies a first cloud containing a group of service providers secured by a first firewall.

At block 1104, a second cloud containing service consumers protected by a second firewall is identified.

At block 1106, an automatic overlay channel between the first cloud and the second cloud is established via a service discovery and the authenticated permissions are registered with the service registration.

At block 1108, the process is capable of permitting an auto overlay channel to establish a first opening at the first firewall in response to the service registration. Note that the auto overlay channel facilitates data passage/transmission between the first and second clouds via the automatic overlay channel. The process also permits the automatic overlay channel to establish a second opening at the second firewall in accordance with the service registration for facilitating data passage between the clouds. In operation, after transmitting data from the first cloud through the first opening of first firewall, the data is allowed to travel through the second openings of second firewall to reach the targeted service consumer at the second cloud with no or minimal authentication or delay.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for facilitating network communication utilizing a group of virtual forwarders ("VFds"), comprising:
   establishing a dynamic service chaining overlay between a network controller and a first VFd for allowing the network controller to manage the first VFd;
   providing an underlay component between a data center and the first VFd for facilitating network communication between the data center and the first VFd;
   receiving a first packet via a first point-to-point ("PTP") connection via an overlay network; and
   forwarding at least a portion of the first packet to a first service component via a second PTP connection from the overlay network to a network infrastructure layer.

2. The method of claim 1, further comprising forwarding the first processed packet to a second virtual forwarder via a first hop-to-hop ("HTH") link through the overlay network in accordance with the first processed packet.

3. The method of claim 1, further comprising identifying the first service component as able to provide a first network function ("NF") in accordance with the first packet.

4. The method of claim 1, further comprising receiving at the second virtual forwarder the first processed packet from a first virtual forwarder via the first HTH link through the overlay network.

5. The method of claim 1, further comprising identifying a second service component able to provide a second NF in accordance with the first processed packet stream.

6. The method of claim 5, further comprising forwarding at least a portion of the first processed packet to the second service component via a third PTP connection from the overlay network to the network infrastructure layer.

7. The method of claim 5, further comprising receiving a second processed packet in response to the first processed packet from the second service component via the third PTP connection.

8. The method of claim 1, further comprising receiving a first processed packet in response to the first packet from the first service component via the second PTP connection.

9. An apparatus configured to facilitate network communication, comprising:
   an overlay network, coupled to a network infrastructure layer, containing a plurality of virtual forwarders ("VFds") and a plurality of hop-to-hop ("HTH") links, wherein the VFds are configured to forward the packet streams from a first VFd of the plurality of VFds to a second VFd of the plurality of VFds via at least one of the plurality of HTH links;
   a dynamic service chaining overlay, coupled to the overlay network, operable to link a network controller to at least one of the plurality of VFds for facilitating VFd management; and
   an underlay component, coupled to the dynamic service chaining overlay, configured to provide connection between a data center and at least one or more VFds of the plurality of VFds for providing device communication.

10. The apparatus of claim 9, wherein the network infrastructure layer contains a plurality of service components able to provide various network functions ("NFs") for processing or routing packet streams.

11. The apparatus of claim 9, further comprising an application layer containing a plurality of customer premises equipments ("CPEs") configured to facilitate network communications.

12. The apparatus of claim 11, wherein the service components include at least one of routers, switches, Internet platforms, cloud servers, and/or satellite hub.

13. The apparatus of claim 11, wherein the CPEs include at least one of servers, portable devices, wireless devices, and cloud emulators.

14. The apparatus of claim 9, further comprising a plurality of first point-to-point ("PTP") connections configured to connect the VFds with the plurality of CPEs.

15. The apparatus of claim 14, further comprising a plurality of second PTP connections configured to connect the VFds with the plurality of service components.

16. The apparatus of claim 9, wherein each of the VFds includes a function definition table indicating various functions associated with various service components.

17. The apparatus of claim 9, wherein each of the VFds includes a service directory table indicating addresses associated with various service components.

18. The apparatus of claim 9, wherein each of the VFds is a forwarder including at least one PTP port configured to connect to a PTP connection for communicating with one of the plurality of service components.

19. A method for facilitating network communication utilizing multiple virtual forwarders ("VFds"), comprising:
establishing a dynamic service chaining overlay between a network controller and a VFd for allowing the VFd to be managed by the network controller;
creating an underlay component between a data center and the VFd for facilitating communication between the data center and the first VFd; and
creating an infrastructure overlay network linking a plurality of virtual entities ("VEs") for providing one or more network functions for facilitating overlay network communication.

20. The method of claim 19, further comprising:
receiving a first packet flow from a customer premises equipment ("CPE") to a first VFd via a first point-to-point ("PTP") north-south ("NS") link; and
identifying a next service component in accordance with the first packet flow.

21. The method of claim 19, further comprising determining a second VFd associated with the next service component in accordance with content stored in a first lookup table in the first VFd, wherein the first lookup table includes information relating to various VFds associated with various service components.

22. The method of claim 19, further comprising forwarding at least a portion of the first packet flow from the first VFd to the second VFd via a hop-to-hop ("HTH") east-west ("EW") link.

23. An apparatus configured to facilitate network communication, comprising:
a plurality of user devices configured to access a communications network via point-to-point ("PTP") connections;
a plurality of service components able to provide various network functions ("NFs") for traffic processing; and
an overlay network containing multiple virtual forwarders ("VFds") and configured to provide communications between the plurality of user devices and the plurality of service components for facilitating the PTP connections utilizing hop-to-hop ("HTH") links.

24. The apparatus of claim 23, wherein each of the VFds includes at least one lookup table containing a set of hop-to-hop ("HTH") links for facilitating operation of the HTH links, and wherein the plurality of user devices are customer premises equipments ("CPEs") configured to access a communications network via the PTP connections.

25. The apparatus of claim 23, wherein one of VFds includes,
a lookup table containing lookup keys,
a location ID table containing information relating to next locations, and
a function definition table indicating various functions associated with various service components.

26. The apparatus of claim 23, wherein one of the VFds includes a service directory table indicating addresses associated with various service components.

27. The apparatus of claim 23, wherein one of the VFds includes at least one PTP port configured to connect to a PTP connection for communicating with a service component.

28. The apparatus of claim 23, wherein one of the FVds is operable to forward a packet stream to one of service components based on a predefined requirement of load balance.

* * * * *